(12) United States Patent
Inoue et al.

(10) Patent No.: US 7,136,343 B2
(45) Date of Patent: Nov. 14, 2006

(54) OPTICAL RECORDING/REPRODUCING METHOD AND OPTICAL RECORDING MEDIUM

(75) Inventors: Hiroyasu Inoue, Tokyo (JP); Koji Mishima, Tokyo (JP); Masaki Aoshima, Tokyo (JP); Hideki Hirata, Tokyo (JP); Hajime Utsunomiya, Tokyo (JP); Hitoshi Arai, Tokyo (JP); Yoshitomo Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 366 days.

(21) Appl. No.: 10/447,109

(22) Filed: May 29, 2003

(65) Prior Publication Data

US 2003/0235134 A1     Dec. 25, 2003

(30) Foreign Application Priority Data

Jun. 3, 2002  (JP) .............................. 2002-162116
Feb. 13, 2003 (JP) .............................. 2003-035067

(51) Int. Cl.
*G11B 7/00* (2006.01)

(52) U.S. Cl. ....................... 369/100; 369/288

(58) Field of Classification Search ................ 369/100, 369/288
See application file for complete search history.

(56) References Cited

U.S. PATENT DOCUMENTS 4,969,141 A * 11/1990 Takaoka et al. ............. 369/100

5,635,267 A * 6/1997 Yamada et al. ............ 428/64.4

FOREIGN PATENT DOCUMENTS

JP       A 62-204442     9/1987

* cited by examiner

*Primary Examiner*—Wayne Young
*Assistant Examiner*—Van Pham
(74) *Attorney, Agent, or Firm*—Oliff & Berridge, PLC

(57) ABSTRACT

An optical recording/reproducing method and an optical recording medium capable of performing excellent optical recording with a simple structure in a recording layer made of environmentally friendly materials. The optical recording medium has a recording layer formed on a substrate and made of a mixture of a recording assist material and a dielectric material. A laser beam of which intensity is modulated in accordance with information to be recorded is irradiated onto this recording layer to cause a state change in the recording assist material and/or the dielectric material. The information can be recorded by changing optical characteristics thereof such as reflectivity. The recording assist material includes an element selected from Sn, Ti, Si, Bi, Ge, and C as a principle component, while the dielectric material as a base material for the dielectric layers is at least one of $ZnS$, $SiO_2$, $AlN$, and $Ta_2O_5$.

4 Claims, 3 Drawing Sheets

OPTICAL RECORDING/REPRODUCING METHOD AND OPTICAL RECORDING MEDIUM

BACKGROUND OF THE INVENTION

1. Field of the Invention

The present invention relates to an optical recording medium and an optical recording/reproducing method using the same.

2. Related Art

As recording media for recording digital data, optical recording media such as CD (Compact Disc) and DVD (Digital Versatile Disc) have been widely used. These optical recording media can be broadly classified into the ROM-type optical recording media such as CD-ROM (Read Only Memory) and DVD-ROM where data is not added or rewritable, the write-once type optical recording media such as CD-R (Recordable) and DVD-R where data can be added but not rewritable, and the rewritable optical recording media such as CD-RW (Rewritable) and DVD-RW where data is rewritable.

As well known, in the ROM-type optical recording media, data is usually recorded in the form of pre-pits formed on the substrate during manufacturing. In the rewritable optical recording media, phase-change material, for example, is used as a material for the recording layer. In general, data is recorded by the use of a change in the optical characteristics caused by the phase change.

Meanwhile, in the write-once type optical recording media, organic dyes such as cyanine dyes, phthalocyanine dyes, and azo dyes are used in the recording layer. In general, data is recorded by the use of a change in the optical characteristics caused by its chemical change (occasionally, a physical change may occur along with the chemical change).

Since organic dyes degrade when exposed to sunlight, for example, it is not easy to improve long-term storage reliability of the medium using such an organic dye in the recording layer thereof. To improve long-term storage reliability of the write-once type optical recording media, it is preferable to make the recording layer with a material other than organic dyes. As an example that has formed the recording layer with a material other than organic dyes, there is a technique to laminate two reaction layers to form a recording layer, as disclosed in Japanese Patent Laid-Open Publication No. Sho 62-204442.

In recent years, the data recording density has been raised and some next-generation type optical recording media capable of transmitting data at a very high rate have been proposed. In such next-generation optical recording media, the spot size of the laser beam used for recording/reproducing data must be focused small to accomplish a high-capacity, high-speed data transmission rate. In order to make the beam spot smaller, the numerical aperture (NA) of the object lens that focuses the laser beam must be 0.7 or larger, for example, near 0.85, and at the same time the wavelength, $\lambda$, of the laser beam must be 450 nm or shorter, for example, near 400 nm.

On the other hand, if the NA of the object lens is raised to focus the laser beam, such a problem arises that the tolerance of warpage and tilt of the optical recording medium, namely, the tilt margin becomes very small. The tilt margin, T, can be expressed by the following Equation (1):

$$T = \lambda/(d \cdot NA^3) \quad (1)$$

where the wavelength of the laser beam used in data recording/reproducing is $\lambda$ and the thickness of the light transmission layer (transparent substrate) working as the light path for the laser beam is d.

As the Equation (1) indicates, the tilt margin becomes smaller as the NA of the object lens grows. Meanwhile, the coefficient W of wave front aberration is expressed by the following Equation (2):

$$W = \{d \cdot (n^2-1) \cdot n^2 \cdot \sin\theta \cdot \cos\theta \cdot (NA)^2\}/\{2\lambda(n^2-\sin^2\theta)^{3/2}\} \quad (2)$$

where the refractivity of the light transmission layer (transparent substrate) where the wave front aberration (coma aberration) arises is n and the tilt angle is $\theta$.

As indicated by Equations (1) and (2), the thickness, d, of the light transmission layer (transparent substrate) where the laser beam for data recording/reproducing comes in must be small to effectively prevent coma aberration while ensuring a large tilt margin, For these reasons, it is important in the next-generation optical recording media to thin the light transmission layer (transparent substrate) to about 100 μm for preventing coma aberration while ensuring a sufficient tilt margin. Thus, in the next-generation type optical recording media, different from the currently-used optical recording media such as CD and DVD, it is difficult to form a recording layer and the like on the light transmission layer (transparent substrate). Instead, such a technique is under investigation that forms a thin resin film as the light transmission layer (transparent substrate) by the spin coating and other methods on the recording layer and the like formed on the substrate. For this purpose, in the manufacturing of the next-generation optical recording media, films are sequentially deposited from the opposite side of the laser incident face, unlike the currently used optical recording media where the films are sequentially deposited from the light incident side.

However, a problem is found that when the recording layer is made of two reaction layers deposited on the substrate in the next-generation optical recording media the noise level is likely to become high (the C/N ratio becomes small) during signal restoration, compared with the conventional optical recording media such as CD and DVD where the recording layer formed in the light transmission layer (transparent substrate) is made of two reaction layers.

Meanwhile, to meet the recent growing needs for environmental protection, the recording layer of the optical recording medium should be made of materials of a smaller environmental burden. Furthermore, to improve the long-term storage reliability, the material for the recording layer of an optical recording medium should be sufficiently resistant to corrosion and degradation.

SUMMARY OF THE INVENTION

An object of the present invention is to provide a novel optical recording/reproducing method and an optical recording medium particularly useful to the recording/reproducing systems adopting next-generation type optical recording media.

As a result of an intensive study, the inventor has found that a simple film structure using environmentally friendly materials such as Sn and ZnS can provide excellent optical recording/reproducing characteristics.

Specifically, the above object is achieved by the following method and medium.

(1) An optical recording/reproducing method comprising the steps of:

externally irradiating a laser beam of which intensity is modulated in accordance with information to be recorded onto a recording layer formed on a substrate and made of a mixture of at least a recording assist material and a dielectric material, and thereby changing a state of at least a part of the dielectric material and changing optical characteristics thereof to record the information; and reading a change in reflectivity resulting from the change in optical characteristics to reproduce the information.

(2) An optical recording/reproducing method comprising the steps of:

externally irradiating a laser beam of which intensity is modulated in accordance with information to be recorded onto a recording layer formed on a substrate and made of a mixture of at least a recording assist material and a dielectric material, and thereby changing a state of at least a part of the recording assist material and thereby changing optical characteristics thereof to record the information; and reading a change in reflectivity resulting from the change in optical characteristics to reproduce the information.

(3) An optical recording/reproducing method comprising the steps of:

externally irradiating a laser beam of which intensity is modulated in accordance with information to be recorded onto a recording layer formed on a substrate and made of a mixture of at least a recording assist material and a dielectric material, and thereby changing a state of at least a part of the dielectric material and a state of at least a part of the recording assist material and changing optical characteristics thereof to record the information; and reading a change in reflectivity resulting from the change in optical characteristics to reproduce the information.

(4) The optical recording/reproducing method according to any one of (1), (2), and (3), wherein the state change of at least one of the dielectric material and the recording assist material is crystal growth.

(5) An optical recording medium comprising:

a substrate; and at least a recording layer formed on the substrate and made of a mixture of a recording assist material and a dielectric material, wherein a laser beam of which intensity is modulated in accordance with information to be recorded is externally irradiated onto the recording layer to cause a state change in at least a part of the recording assist material to record the information by a change in optical characteristics thereof, and the information can be reproduced by reading a change in reflectivity resulting from the change in optical characteristics.

(6) An optical recording medium comprising:

a substrate; and at least a recording layer formed on the substrate and made of a mixture of a recording assist material including a state-change assisting material and a dielectric material including a base material of which state can be changed, wherein a laser beam of which intensity is modulated in accordance with information to be recorded is externally irradiated onto the recording layer to cause a state change in at least a part of the base material to record the information by a change in optical characteristics thereof, and the information can be reproduced by reading a change in reflectivity resulting from the change in optical characteristics.

(7) An optical recording medium comprising:

a substrate; and at least a recording layer formed on the substrate and made of a mixture of a recording assist material including a state-change assisting material and a dielectric material including a base material of which state can be changed, wherein a laser beam of which intensity is modulated in accordance with information to be recorded is externally irradiated onto the recording layer to cause a state change in at least a part of the recording assist material and in at least a part of the dielectric material to record the information by a change in optical characteristics thereof, and the information can be reproduced by reading a change in reflectivity resulting from the change in optical characteristics.

(8) An optical recording medium comprising;

a substrate; and at least a recording layer formed on the substrate and made of a mixture of a recording assist material and a dielectric material, wherein the recording assist material includes at least one element selected from the group consisting of Sn, Ti, Si, Bi, Ge, C, V, W, Zr, Zn, Mg, Mn, Ag, Al, Nb, Au, Cu, and Ta, as a principle component.

(9) The optical recording medium according to (8), wherein the dielectric material has at least one material selected from the group consisting of $Al_2O_3$, AlN, ZnO, ZnS, GeN, GeCrN, $CeO_2$, SiO, $SiO_2$, $Ta_2O_5$, SiC, MgO, MgF, LaSiON, $Si_3N_4$, $TiO_2$, and InSnO, as a principle component.

DESCRIPTION OF PREFERRED EMBODIMENTS OF THE INVENTION

Now embodiments of the invention will be described in detail with reference to the accompanying drawings.

Figure 1:
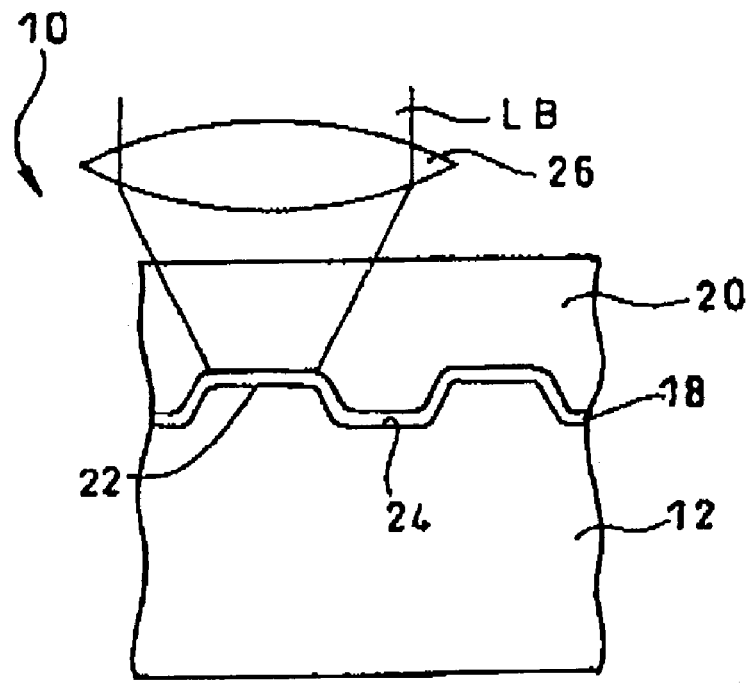
FIG. 1 is a schematic view showing an optical recording medium according to a first embodiment of the invention.

The optical recording medium 10 according to the present embodiments is the write-once type medium. As shown in FIG. 1, this medium is composed of a substrate 12, a recording layer 18, and a light transmission layer 20 deposited in this order. The recording layer 18 is made of a mixture of a recording assist material and dielectric material. In the optical recording medium 10 of this structure, data recording/reproducing is performed by a laser beam LB irradiated from the side of the light transmission layer 20.

The substrate 12 works as a base structure that provides a mechanical rigidity required of the optical recording medium 10. Grooves 22 and/or lands 24 are formed on the substrate surface. These grooves 22 and lands 24 work as guide tracks for the laser beam during data recording/reproducing.

The substrate 12 is about 1.1 mm thick and can be made of various materials such as glass, ceramics, and resin. Resin is a preferable material in terms of moldability. Examples of such resin include polycarbonate resin, acryl resin, epoxy resin, polystyrene resin, polyethylene resin, polypropylene resin, silicone resin, fluoride-based resin, ABS resin, and urethane resin. Particularly, polycarbonate resin is preferable in terms of processability.

The dielectric material contains a state-change material as the base material. Optical characteristics including reflectivity of this material are varied due to energy by laser irradiation or the like.

The dielectric material as the base material may be any material as long as it can cause a state change. Its principle component can be, for example, oxides, sulfides, nitrides, or their combination. More specifically, its principle component should be at least one dielectric material selected from the group consisting of $Al_2O_3$, AlN, ZnS, GeN, GeCrN, $CeO_2$, SiO, $SiO_2$, $Ta_2O_5$, SiC, MgO, MgF, LaSiON, $SiN_3N_4$, $TiO_2$ and InSnO. A dielectric material comprising ZnS—$SiO_2$ as principle components is particularly preferable.

Note that the "use of a . . . material as a principle component" means that the content of such a dielectric material is the largest in the base material. Also note that "ZnS—$SiO_2$" means a mixture of ZnS and $SiO_2$.

The thickness of the recording layer 18 is not limited, the thickness is preferably 3–200 nm. If it is thinner than 3 nm, a sufficient change in the optical characteristics such as reflectivity of the entire layer does not occur even when the base material in the dielectric material has caused a sufficient change of state, and a sufficiently high C/N ratio is not provided. Meanwhile, if the layer is thicker than 200 nm, the time for film deposition becomes long and the productivity may decrease, more heat becomes necessary to cause a change in the state of the base material in the dielectric material, and cracks are likely to be produced because of stress in the dielectric material.

The recording assist material is a material that accelerates the reactions in the base material, and is mixed with the dielectric material as described above. When a laser beam of a power higher than a predetermined level is irradiated thereon, the elements of the recording assist material receive the heat of the laser beam and then work on the dielectric material. Then the dielectric material causes a state change in whole or in part (for example, from amorphous to crystalline) to provide recording marks. This change of state may accompany a change of state (crystal growth) specific to a material contained in the recording assist material. This change of state will lead to improved C/N.

In the recording layer 18, the optical behavior against reproducing light significantly differ between the portion where recording marks have been formed and the other portion without recording marks. Thus data recording/reproducing can be conducted based on such difference. This state can be confirmed by the X-ray diffraction or transmission electron microscopy.

The recording assist material has at least one element selected from the group consisting of Sn, Ti, Si, Bi, Ge, C, V, W, Zr, Zn, Mg, Mn, Al, Nb, Au, Cu, Ta and Ag as a principle component.

The principle component should account for 50% or more in the elements constituting the recording assist material, preferably 80 atomic percent (at %).

If it is lower than 50 at %, the effect of changing the state of the dielectric material becomes insufficient and then C/N decreases. Furthermore, because of recording, the film itself is likely to be destructed and thereby storage reliability degrades.

Meanwhile, to lower the laser beam power to some extent for a smooth state change in the dielectric layer, the major element should account for 80 at % or more.

The light transmission layer 20 is the layer working as the laser beam incident face and as a light path for the laser beam. Its thickness should be 10–300 μm, more preferably 50–150 μm. The material for the light transmission layer 20 is not limited, but acryl- or epoxy-based ultraviolet-curable resin is preferable. Instead of using an ultraviolet-curable resin film, a transparent sheet made of a transparent resin may be combined with glues and adhesives to form the light transmission layer 20.

Next explained is an example of how to manufacture the optical recording medium 10.

First, the recording layer 18 is formed on the substrate 12 where grooves 22 and lands 24 have been formed in advance. For the deposition of the dielectric material and the recording assist material, a vapor growth method using chemical species containing elements constituting the second dielectric layer can be adopted. Such a vapor growth method may be the vacuum deposition method and sputtering method. In this case, chemical species where a dielectric material and a recording assist material are mixed may be employed in combination or separately.

Finally, the light transmission layer 20 is formed on the recording layer 18. The light transmission layer 20 can be formed by, for example, the spin coating method that uses acryl- or epoxy-based ultraviolet-curable resin of which viscosity has been optimized in advance and cures this resin film by ultraviolet irradiation. Then the manufacturing of the optical recording medium is completed.

The method of manufacturing the optical recording medium is not limited to the above example, but various techniques for manufacturing well-known optical recording media can be employed as well.

Now the optical recording/reproducing method using the above optical recording medium 10 will be described below.

Laser beam LB of a predetermined output power is irradiated onto the optical recording medium 10. The laser beam comes in the light transmission layer 20 and reaches the recording layer 18. It is preferred that the numerical aperture (NA) of the object lens that focuses laser beam LB should be 0.7 or higher, particularly 0.85 or so. It is preferred that the wavelength, $\lambda$, of laser beam LB should be 450 nm or shorter, particularly 405 nm or so. Then, it is preferable to make $\lambda/NA<640$ nm.

By irradiation of laser beam LB, the recording assist material constituting the recording layer 18 is heated by laser beam LB and recording assist material work on the adjacent dielectric material, accelerating the state change (for example, change from amorphous to crystalline), to form recording marks therein.

In this case, crystal growth may occur in the recording assist material itself, and the extent of this crystallization may be larger than that of the dielectric material.

The optical characteristics of the portion where recording marks have been formed are distinctively different from those of the other portion (non-recorded portion). Therefore, when a laser beam for mark reproducing is irradiated onto these recorded portion and the non-recorded portion, their reflectivities differ from each other and thereby the recorded data can be read. In other words, data can be recorded/read through modification of the optical characteristics.

The present invention is not limited to the above embodiment and can be modified in various ways within the scope of the appended claims, and such modifications are also included in the present invention.

In the optical recording medium 10 according to the above embodiments, the recording layer 18 is made of a single, layer. The present invention, however, is not limited to this structure. The state-change assisting layer may be made of two or more layers if the same effect as above can be provided.

Figure 2:
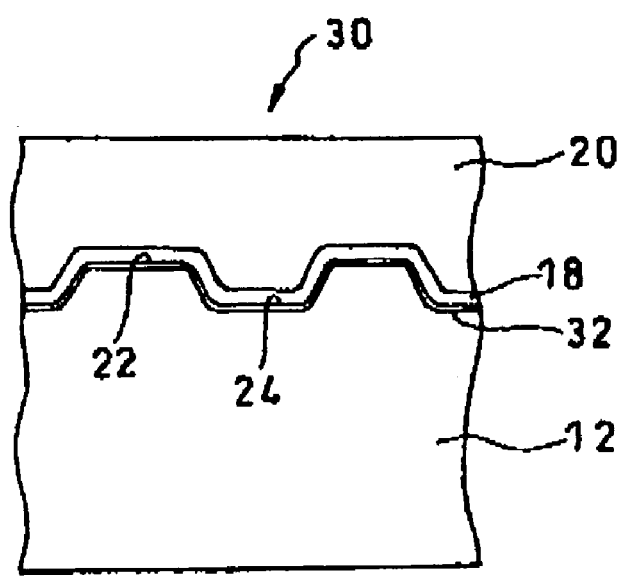
FIG. 2 is a schematic view showing an optical recording medium according to a second embodiment of the invention.

The above optical recording medium 10 does not have a reflection layer on the substrate 12. However, to enhance the laser reflection from the recorded portion having recording marks and the non-recorded portion, a reflection layer 32 may be formed as in the case of the optical recording medium 30 shown in FIG. 2.

The reflection layer 32 reflects the laser beam coming in from the side of the light transmission layer 20 and reflects it therethrough. Its thickness should be 5–300 nm, preferably 10–200 nm. The material for the reflection layer 32 is not particularly limited as long as it can reflect laser beams; for example, it can be Mg, Al, Ti, Cr, Fe, Co, Ni, Cu, Zn, Ge, Ag, Pt or Au. Because of high reflectivity, metallic materials such as Al, Au, Ag, or Cu, or their alloys (for example, Ag—Cu alloy) are particularly preferable. If the reflection layer 32 is formed, a high signal restoring ratio (C/N ratio) is easily attained after optical recording by virtue of the multi-interference effect.

Examples and Compared Examples

Now the present invention will be explained more specifically along with some examples, but the invention is not limited to those examples.

[Preparation of the optical recording medium]

Example 1

Optical recording media were fabricated via the following steps.

First, a polycarbonate substrate of which thickness was 1.1 mm and diameter was 120 mm was set in a sputtering apparatus. On the light reflection layer of this polycarbonate substrate, a recording layer having a thickness of 10 nm was formed by simultaneously sputtering the dielectric material made of a mixture of ZnS and $SiO_2$ and the recording assist material made of Sn. It was designed to have the recording assist material and ZnS—$SiO_2$ (80:20) at a molar ratio of 50:50.

Next, on the recording layer, an acrylic ultraviolet-curable resin was coated by the spin coating method and the light transmission layer (thickness: 100 μm) was formed by ultraviolet irradiation thereon.

The molar ratio between ZnS and $SiO_2$ in the first and second dielectric layers was ZnS:$SiO_2$=80:20.

Examples 2 and 3

Examples 2 and 3 were prepared in the same manner as in the example 1 except that Sn in the example 1 was replaced by Ag and Ti, respectively.

Compared Example

In the compared example, an optical recording medium was fabricated to have a single-layered structure where the recording layer was made of only Sn.

Example(s) 4–12

The optical recording medium with a recording layer of a single-layer structure was fabricated without forming any dielectric layer. The recording layer was made of a mixture of ZnS—$SiO_2$ (ZnS:$SiO_2$=80:20) and a metal or semi-metal of Mg, Nb, Bi, Mg, Au, Al, Au, Cu, Ta, or Si.

Example(s) 13–34

The optical recording media were fabricated by replacing ZnS—SiOz (ZnS:$SiO_2$=80:20) employed in the examples 4–12 to other materials. Mg (examples 13–17), Ti (examples 18–25), Sn (examples 26,27), Nb (examples 28–30), or Al (examples 31–34) was mixed in the optical recording medium.

Example(s) 35–37

The optical recording medium with a recording layer of a single-layer structure was fabricated without forming any dielectric layer. The recording layer was made of a mixture of Zn and other materials. The other materials are ZnS, ZnO and ZnS:$SiO_2$(80:20).

[Recording/reproducing]

The above fabricated optical recording media were each set in an optical disk tester (trade name: DDU1000 manufactured by Pulstec Industrial Co., Ltd.). A recording laser beam having a wavelength of 405 nm (blue) and an object lens with an NA (numerical aperture) of 0.85 were employed in the individual optical recording media in common. This laser beam was focused with a focusing lens installed in the recording head and then irradiated from the light transmission layer side onto the optical recording medium for optical recording.

The conditions for signal recording were that the modulation mode was (1, 7) RLL, the channel bit length was 0.12 μm, the linear recording rate was 5.3 m/s, the channel clock was 66 MHz, and the recorded signals were 8T.

Next, the information recorded with the aforementioned optical disk tester was reproduced and the C/N ratio of read signals was measured for each of the optical recording media fabricated in the individual examples and compared examples of different recording assist material and dielectric material constituting the recording layer and of different thicknesses of the entire recording layer. In the reproducing apparatus, the wavelength of the laser beam used in reproduction was 405 nm, the NA (numerical aperture) of the object lens was 0.85, and the laser beam output power was 0.3 mW.

The test results are listed in Tables 1–6.

TABLE 1

|  | Example 1 | Example 2 |
|---|---|---|
| Film structure Recording layer Reflection layer | Sn + 80:20 (10 nm) | Ag + 80:20 (10 nm) |
| 8T C/N (dB) | 51.1 | 43.4 |

|  | Example 3 | Compared example 1 |
|---|---|---|
| Film structure Recording layer Reflection layer | Ti + 80:20 (30 nm) | Sn (6 nm) |
| 8T C/N (dB) | 51.2 | 29.1 |

"80:20" means the molar ratio of ZnS:$SiO_2$ in ZnS + $SiO_2$.
Notation "ZnS:$SiO_2$" is omitted in the table.
Figure in ( ) indicates the thickness of the entire recording layer.

TABLE 2

|  | Example 4 | Example 5 | Example 6 |
|---|---|---|---|
| Film structure Recording layer Reflection layer | 80:20 + Mg (30 nm) | 80:20 + Nb (50 nm) | 80:20 + Bi (10 nm) |
| 8T C/N (dB) | 55.7 | 50.2 | 51.2 |

|  | Example 7 | Example 8 | Example 9 |
|---|---|---|---|
| Film structure Recording layer Reflection layer | 80:20 + MgAu (30 nm) | 80:20 + Al (15 nm) | 80:20 + Au (20 nm) |
| 8T C/N (dB) | 52.8 | 55.4 | 48.9 |

|  | Example 10 | Example 11 | Example 12 |
|---|---|---|---|
| Film structure Recording layer Reflection layer | 80:20 + Cu (15 nm) | 80:20 + Ta (20 nm) | 80:20 + Si (40 nm) |
| 8T C/N (dB) | 49.5 | 46.6 | 48.6 |

"80:20" means the molar ratio of $ZnS:SiO_2$ in $ZnS + SiO_2$.
Notation "$ZnS:SiO_2$" is omitted in the table.
Figure in ( ) indicated the thickness of the entire recording layer.

TABLE 3

|  | Example 13 | Example 14 | Example 15 |
|---|---|---|---|
| Film structure Recording layer Reflection layer | MgO + Mg (30 nm) | MgF + Mg (30 nm) | SiO2 + Mg (20 nm) |
| 8T C/N (dB) | 35.1 | 48.2 | 55.4 |

|  | Example 16 | Example 17 |
|---|---|---|
| Film structure Recording layer Reflection layer | ZnS + Mg (20 nm) | LaSiON + Mg (15 nm) |
| 8T C/N (dB) | 52 | 52.3 |

Figure in ( ) indicates the thickness of the entire recording layer.

TABLE 4

|  | Example 18 | Example 19 | Example 20 |
|---|---|---|---|
| Film structure Recording layer Reflection layer | Si3N4 + Ti (50 nm) | ZnS + Ti (30 nm) | TiO2 + Ti (30 nm) |
| 8T C/N (dB) | 42.3 | 50.1 | 48.3 |

|  | Example 21 | Example 22 | Example 23 |
|---|---|---|---|
| Film structure Recording layer Reflection layer | SiO2 + Ti (50 nm) | SiC + Ti (30 nm) | 80:20 + Ti (10 nm) |
| 8T C/N (dB) | 44.7 | 51.6 | 51.2 |

|  | Example 24 | Example 25 |
|---|---|---|
| Film structure Recording layer Reflection layer | 50:50 + Ti (10 nm) | Ta2O5 + Ti (35 nm) |
| 8T C/N (dB) | 45.4 | 48.5 |

"80:20" and "50:50" mean the molar ratio of $ZnS:SiO_2$ in $ZnS + SiO_2$.
Notation "$ZnS:SiO_2$" is omitted in the table.
Figure in ( ) indicates the thickness of the entire recording layer.

TABLE 5

|  | Example 26 | Example 27 | Example 28 |
|---|---|---|---|
| Film structure Recording layer Reflection layer | InSnO + Sn (50 nm) | 80:20 +Sn (10 nm) | 80:20 + Nb (50 nm) |
| 8T C/N (dB) | 40.9 | 32.1 | 50.2 |

|  | Example 29 | Example 30 | Example 31 |
|---|---|---|---|
| Film structure Recording layer Reflection layer | Ta2O5 + Nb (25 nm) | TiO2 + Nb (35 nm) | 80:20 + Al (15 nm) |
| 8T C/N (dB) | 45.4 | 54.6 | 55.4 |

|  | Example 32 | Example 33 | Example 34 |
|---|---|---|---|
| Film structure Recording layer Reflection layer | LaSiON + Al (40 nm) | Ta2O5 + Al (25 nm) | TiO2 + Al (35 nm) |
| 8T C/N (dB) | 49.3 | 50.5 | 48.9 |

"80:20" means the molar ratio of $ZnS:SiO_2$ in $ZnS + SiO_2$.
Notation "$ZnS:SiO_2$" is omitted in the table.
Figure in ( ) indicates the thickness of the entire recording layer.

TABLE 6

|  | Example 35 | Example 36 | Example 37 |
|---|---|---|---|
| Film structure Recording layer | ZnS + Zn (30 nm) | ZnO + Zn (30 nm) | 80:20 + Zn (30 nm) |
| 8T C/N (dB) | 47 | 48.2 | 49.5 |

"80:20" means the molar ratio of $ZnS:SiO_2$ in $ZnS + SiO_2$.
Notation "$ZnS:SiO_2$" is omitted in the table.
Figure in ( ) indicates the thickness of the entire recording layer.

As evident from the results shown in Tables 1–6, these examples 1–37 have succeeded in providing a high C/N ratio by mixing the dielectric material and the recording assist material for recording.

The recorded portion and non-recorded portion of the structure of mixture of $ZnS-SiO_2$ (80:20) and Sn (10 nm) was analyzed by the X-ray diffraction. Before recording, crystals of Sn is recognized. After recording, crystals of both of ZnS and Sn observed. And crystallization of ZnS and Sn are recognized with a transmission electron scope.

In this measurement of X-ray diffraction, the X-ray was Cu-Kα, and the tube voltage and tube current were 50 kV and 300 mA, respectively. The JCPDS cards were used to identify the diffraction peaks. For example, β-Sn is numbered 04–0673 and the positions of its diffraction peaks are known with reference to the card.

Figure 3A:
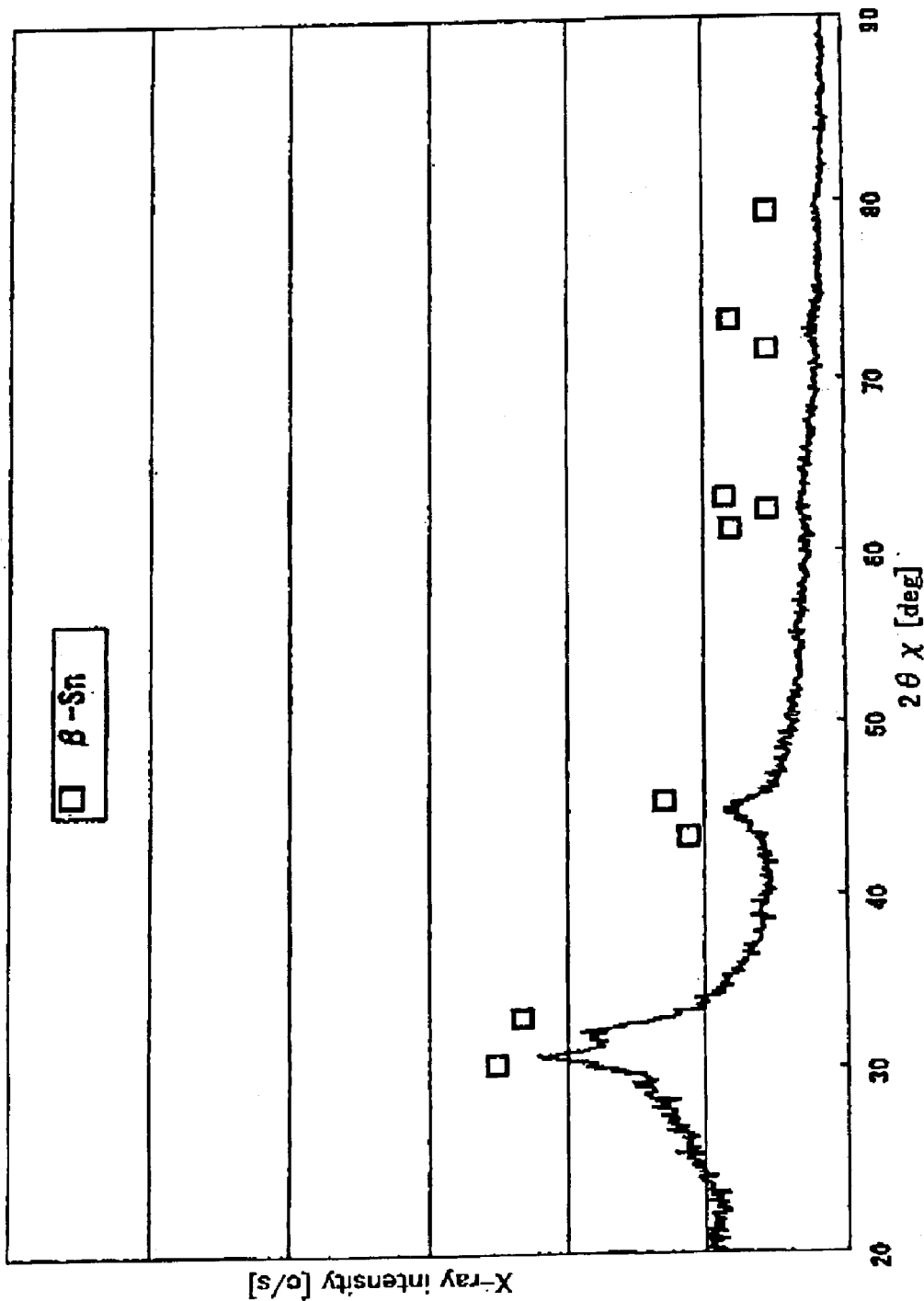
FIG. 3A is an X-ray diffraction pattern of a non-recorded portion of the optical recording medium of the example 1.
Figure 3B:
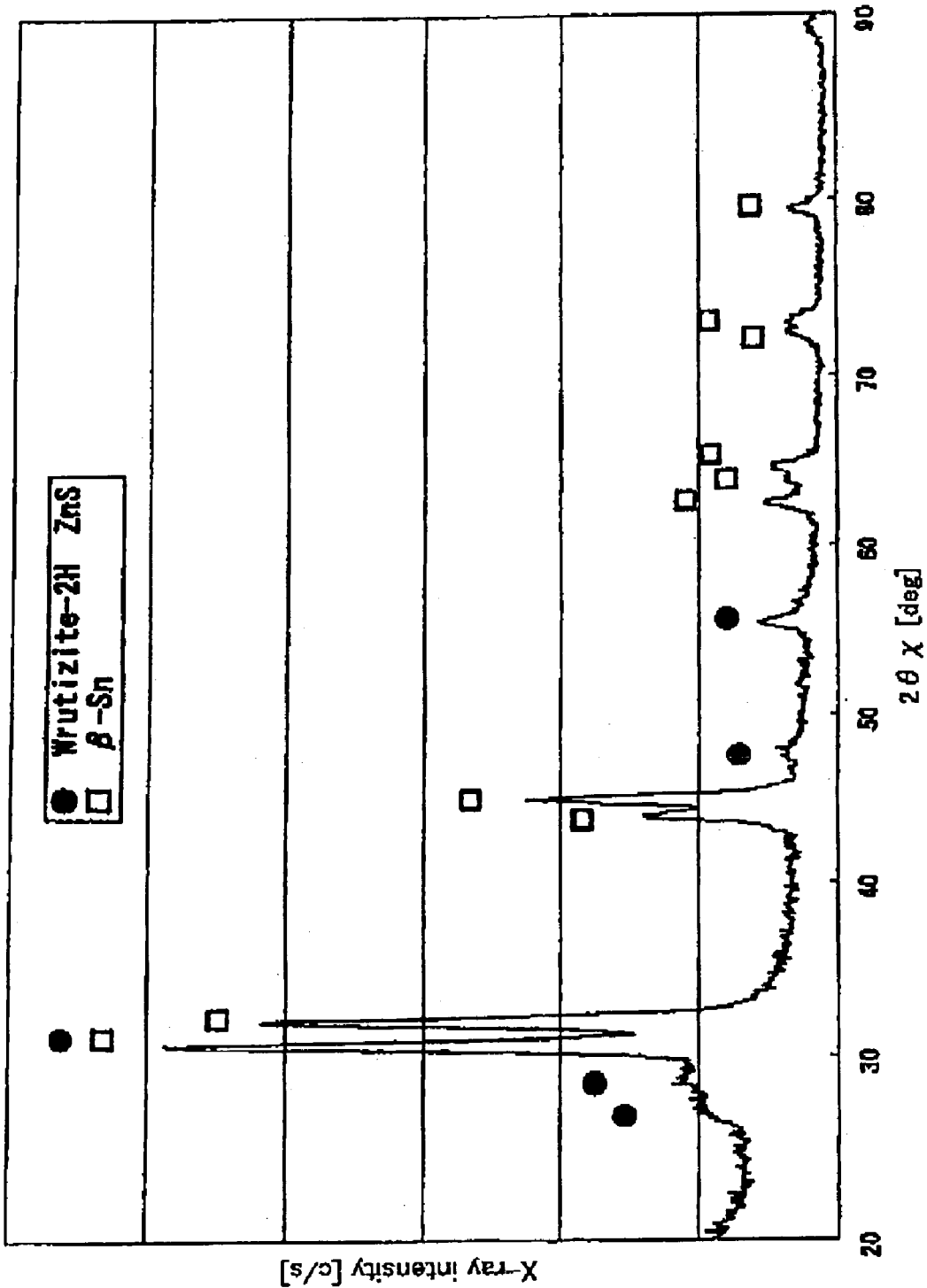
FIG. 3B is an X-ray diffraction pattern of a recorded portion of the optical recording medium of the example 1.

Under the structure described in the example 1 (ZnS—$SiO_2$/Sn mixed type layered structure), the recorded portion and the non-recorded portion were analyzed by the X-ray diffraction, (FIGS. 3A and 3B).

A diffraction peak of β-Sn is observed in the diffraction pattern of the non-recorded portion (FIG. 3A), while almost no peak of ZnS was observed. Thus it is understood that this Sn is crystalline. On the other hand, the recorded portion (FIG. 3B) showed a sharp diffraction peak of ZnS, indicating crystallization of ZnS. A number of ZnS diffraction peaks indicated that the crystallization of ZnS proceeds by recording.

As described above, the optical recording/reproducing method and optical recording medium of the present invention enable to record/read data with a simple structure in a novel manner not adopted in the past while reducing environmental loads.

What is claimed is:

1. An optical recording/reproducing method comprising the steps of:

externally irradiating a laser beam of which intensity is modulated in accordance with information to be recorded onto a recording layer formed on a substrate and made of a mixture of at least a recording assist material and a dielectric material, and thereby changing a state of at least a part of the dielectric material into crystal and changing optical characteristics thereof to record the information; and reading a change in reflectivity resulting from the change in optical characteristics to reproduce the information.

2. An optical recording/reproducing method comprising the steps of:

externally irradiating a laser beam of which intensity is modulated in accordance with information to be recorded onto a recording layer formed on a substrate and made of a mixture of at least a recording assist material and a dielectric material, and thereby changing a state of at least a part of the dielectric material into crystal and a state of at least a part of the recording assist material and changing optical characteristics thereof to record the information; and reading a change in reflectivity resulting from the change in optical characteristics to reproduce the information.

3. An optical recording medium comprising:

a substrate; and at least a recording layer formed on the substrate and made of a mixture of a recording assist material including a state-change assisting material and a dielectric material including a base material made of ZnS of which state can be changed into crystal, wherein a laser beam of which intensity is modulated in accordance with information to be recorded is externally irradiated onto the recording layer to cause a state change in at least a part of the base material to record the information by a change in optical characteristics thereof, and the information can be reproduced by reading a change in reflectivity resulting from the change in optical characteristics.

4. An optical recording medium comprising:

a substrate; and at least a recording layer formed on the substrate and made of a mixture of a recording assist material including a state-change assisting material and a dielectric material including a base material of which state can be changed into crystal, wherein a laser beam of which intensity is modulated in accordance with information to be recorded is externally irradiated onto the recording layer to cause a state change in at least a part of the recording assist material and in at least a part of the dielectric material to record the information by a change in optical characteristics thereof, and the information can be reproduced by reading a change in reflectivity resulting from the change in optical characteristics.

* * * * *